United States Patent
Lee et al.

(10) Patent No.: US 8,165,530 B2
(45) Date of Patent: Apr. 24, 2012

(54) METHOD FOR TRANSMITTING CHANNEL INFORMATION IN MULTIPLE ANTENNA SYSTEM

(75) Inventors: Wook Bong Lee, Anyang-si (KR); Dong Ku Kim, Anyang-si (KR); Yo Han Kim, Anyang-si (KR); Jang Hoon Yang, Anyang-si (KR); Bin Chul Ihm, Anyang-si (KR); Hyuk Jin Chae, Anyang-si (KR)

(73) Assignee: LG Electronics Inc., Seoul (KR)

( * ) Notice: Subject to any disclaimer, the term of this patent is extended or adjusted under 35 U.S.C. 154(b) by 538 days.

(21) Appl. No.: 12/382,363

(22) Filed: Mar. 13, 2009

(65) Prior Publication Data
US 2009/0239473 A1    Sep. 24, 2009

(30) Foreign Application Priority Data
Mar. 24, 2008  (KR) .................. 10-2008-0026945

(51) Int. Cl.
*H04B 17/00*    (2006.01)

(52) U.S. Cl. .................................................... 455/67.13
(58) Field of Classification Search ................ 455/67.13
See application file for complete search history.

(56) References Cited

U.S. PATENT DOCUMENTS

2007/0189235 A1 *  8/2007  Chandra et al. ............... 370/335

* cited by examiner

*Primary Examiner* — Lincoln Donovan
*Assistant Examiner* — Daniel Rojas
(74) *Attorney, Agent, or Firm* — McKenna Long & Aldridge LLP

(57) ABSTRACT

A method for transmitting channel information in a multi-antenna system, the method includes calculating channel quality information (CQI) with respect to each mode, comparing the CQI with respect to each mode to a threshold value with respect to each mode, and transmitting CQI with respect to a mode having higher CQI than the threshold value as channel information. Good performance can be achieved regardless of the number of users or an SNR of users.

8 Claims, 14 Drawing Sheets

METHOD FOR TRANSMITTING CHANNEL INFORMATION IN MULTIPLE ANTENNA SYSTEM

CROSS-REFERENCE TO RELATED APPLICATIONS

This application claims the benefit of priority of Korean Patent Application No. 10-2008-0026945 filed on Mar. 24, 2008 which are incorporated by reference in its entirety herein.

BACKGROUND

1. Field of the Invention

The present invention relates to channel information transmission method and, more particularly, to a method for transmitting channel information in a multi-antenna system.

2. Description of the Related Art

Due to generalization of information communication services and the advent of various multimedia services and high-quality services, demand for communication services is radically increasing. To meet the demand, diverse wireless communication technologies are under study in multiple sectors.

A multi-input multi-output (MIMO) system refers to a system improving a data transmission/reception efficiency by using multiple transmit antennas and multiple receive antennas. Recently, research on the channel capacity of a multi-user MIMO system for allowing multiple users to effectively use space resources has been actively processing.

A dirty paper coding (DPC) scheme, in which a base station removes data of other users acting as interference in advance, to thus reduce interference from other users, provides a maximum channel capacity in the multi-user MIMO system. However, a large amount of channel information and complex calculations (i.e., computations, operations) required at a transmission end make it difficult to implement the DPC scheme in an actual system.

For a substantial implementation, a PU2RC (Per User Unitary and Rate Control) proposed by Samsung Electronics Inc. in "Downlink MIMO for EUTRA" of 3GPP TSG RAN WG1 #44/R1-060335 is a scheme in which spatial resources are simultaneously allocated to multiple users. According to this scheme, each user selects a precoding matrix and vector that can maximize their channel transmission rate from among a plurality of precoding matrixes, and feeds back an index of the vector and a signal-to-interference plus noise ratio (SINR) to a base station.

The Related Art PU2RC scheme uses multi-user diversity in a spatial area. Thus, it exhibits good performance when the number of users is large, but if there are not many users, the PUR2C scheme cannot ensure sufficient multi-user diversity.

As a solution to this problem, the method of using a Zero Forcing receiver and an MMSE SIC (Minimum Mean Squared Error Successive Interference Cancellation) receiver, which was proposed in "Adaptive Mode Switching in the Gaussian MIMO Broadcast Channel" by C. Lee, C. B. Chea, S. Vishwanath, R. W. Health, Jr. in Proc. of the IEEE Radio and Wireless Symposium, Orlando, Fla., in January 2000, adaptively employs a multi-user multi-input/output scheme and a single user multi-input/output scheme. In this scheme, when a signal-to-noise ratio (SNR) is high and the number of matrix codebook is 1, the fact that two types of transmission rates intersect according to the number of users is checked and the intersection is theoretically calculated. However, this scheme has a problem in that each user should hold the two types of receivers and it can be hardly applied when there are several precoding matrixes or when the SNR is low.

In addition, there has been proposed a technique for adaptively changing the number of signals using space resources as disclosed in "Multimode Precoding for MIMO Wireless Systems," by D. J. Love, R. W. Health Jr. in IEEE Trans. Signal Process. Vol. 53, No. 10, pp. 3674-3687 in October 2005. This technique considers only the single user multi-input/output scheme, and because there is no need to consider channel status of other users to determine an optimum mode, a user can determine an optimum mode by using his channel and only needs to feed back channel information only with the determined mode. However, when the technique is applied to the multi-user multi-input/output scheme, because modes requested by each user to maximize a transmission rate are different, channel information of each user should be all fed back or channel information with respect to every candidate mode should be fed back to determine an optimum mode in the system. Thus, if this technique is applied as it is to the multi-user multi-input/output scheme, the amount of feedback information would be hugely increased.

Therefore, an object of the present invention is to provide a method for transmitting/receiving channel information that exhibits good performance regardless of the number of users or an SNR of users.

Another object of the present invention is to provide a method for transmitting/receiving channel information capable of reducing the amount of information fed back from a UE to a base station.

SUMMARY

In an aspect, a method for transmitting channel information in a multi-antenna system, the method includes calculating channel quality information (CQI) with respect to each mode, comparing the CQI with respect to each mode to a threshold value with respect to each mode, and transmitting CQI with respect to a mode having higher CQI than the threshold value as channel information.

In another aspect, a method for receiving channel information in a multi-antenna system includes receiving channel quality information (CQI) with respect to each mode having higher CQI than a threshold value, updating a threshold value with respect to each mode by using the received CQI, and transmitting the updated threshold values.

DETAILED DESCRIPTION OF THE INVENTION

Exemplary embodiments of the present invention will now be described in detail with reference to the accompanying drawings.

A user equipment (UE) may be fixed or mobile and may be referred to by other names such as mobile station (MS), user terminal (UT), subscriber station (SS), wireless device, user, etc. A base station (BS) generally refers to a fixed station that communicates with the UE and may be called by other names such as node-B, base transceiver system (BTS), access point, etc.

Mode refers to the number of signals, namely, streams used to transmit data. Here, a precoding matrix vector combination in each mode is called a sub-mode. For example, in case of $N_T=4$, the number of feasible modes is 4, and the number of combinations that may be generated for a single precoding matrix, namely, the number of sub-modes, totals 15. This can be represented by a set as follows.

$$L=1: A_{1,1}=\{1\}, A_{1,2}=\{2\}, A_{1,3}=\{3\}, A_{1,4}=\{4\}$$

$$L=2: A_{2,1}=\{1,2\}, A_{2,2}=\{1,3\}, A_{2,3}=\{1,4\}, A_{2,4}=\{2,3\}, A_{2,5}=\{2,4\}, A_{2,6}=\{3,4\}$$

$$L=3: A_{3,1}=\{1,2,3\}, A_{3,2}=\{1,2,4\}, A_{3,3}=\{1,3,4\}, A_{3,4}=\{2,3,4\}$$

$$L=4: A_{4,1}=\{1,2,3,4\}$$

In $A_{L,j}$, L is the number of transmission signals, or mode, and j is a combination that may be generated in a corresponding mode, or the index of a sub-mode. The number of sub-modes of each mode totals 15, but each mode may have only one or two sub-modes. The important thing is adaptively changing the number of streams.

Figure 1:
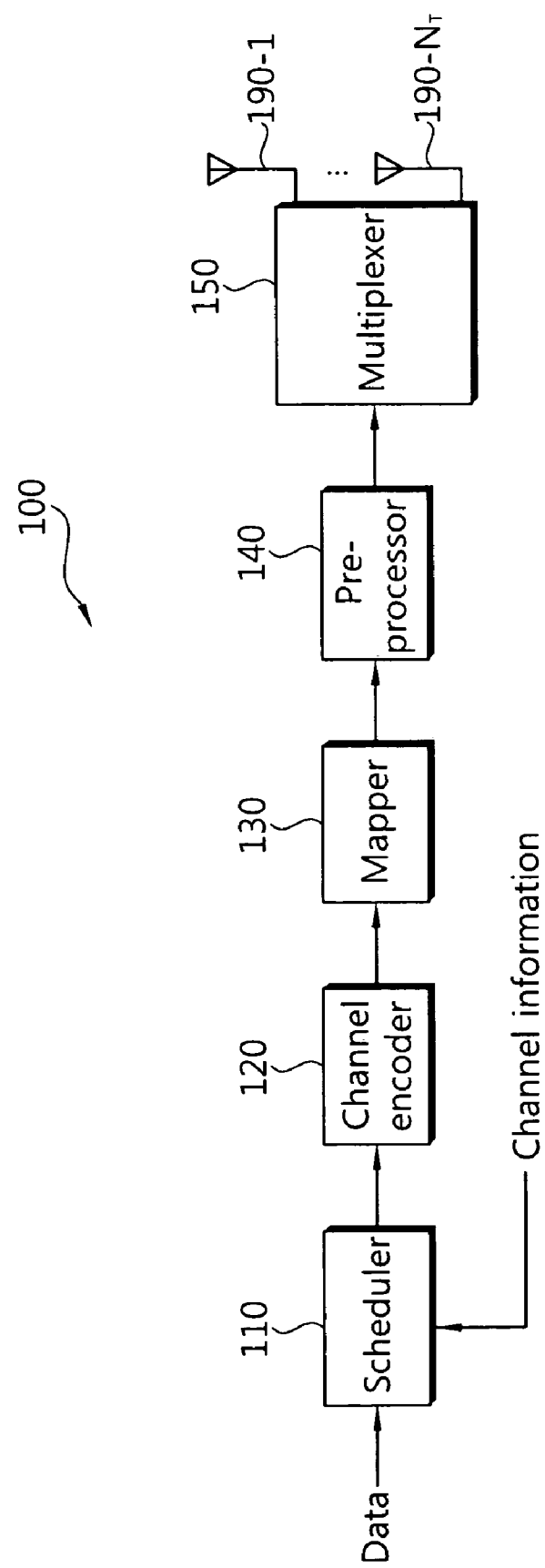
FIG. 1 is a schematic block diagram showing a transmitter with a multi-antenna.

FIG. 1 is a schematic block diagram of a transmitter with multiple antennas.

With reference to FIG. 1, a transmitter 100 includes a scheduler 110, a channel encoder 120, a mapper 130, a pre-processor 140, and a multiplexer 150. The transmitter 100 includes $N_T$ ($N_T>1$) number of transmit antennas 190-1, ..., 190-$N_T$. In downlink, the transmitter 100 may be a part of the BS. In uplink, the transmitter 100 may be a part of the UE.

The scheduler 110 determines the suitable number of UEs, mode, and precoding matrix by using channel information fed back from users.

The channel encoder 120 encodes input streams according to a determined coding scheme to form coded data.

The mapper 130 maps the coded data to symbols representing positions on a signal constellation. The symbols are called data symbols.

The pre-processor 140 performs precoding on the input data symbols. Precoding is a scheme for performing preprocessing on data symbols to be transmitted.

The multiplexer 150 allocates input symbols to appropriate subcarriers, and multiplexes the same respecting to users. The multiplexed symbols are modulated and then transmitted via the transmit antennas 190-1, ..., 190-$N_T$.

Figure 2:
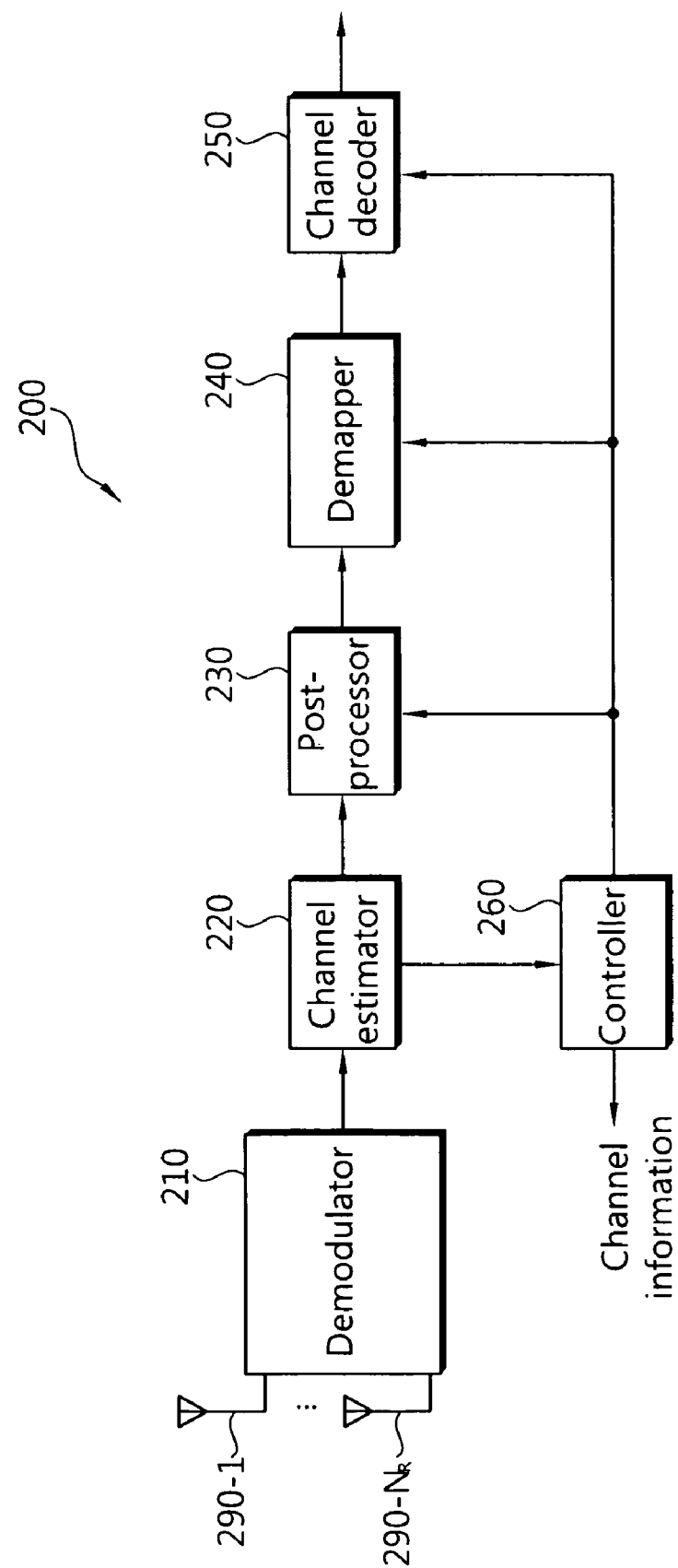
FIG. 2 is a schematic block diagram showing a receiver with a multi-antenna.

FIG. 2 is a schematic block diagram of a receiver with multiple antennas.

With reference to FIG. 2, the receiver 200 includes a demodulator 210, a channel estimator 220, a post-processor 230, a demapper 240, a channel decoder 250, and a controller 260. The receiver 200 includes $N_R$ ($N_R>1$) number of receive antennas 290-1, ..., 290-$N_R$. In downlink, the receiver 200 may be a part of the UE, and in uplink, the receiver 200 may be a part of the BS.

Signals received from the receive antennas 290-1, ..., 290-$N_R$ are demodulated by the demodulator 210. The channel estimator 220 estimates a channel, and the post-processor 230 performs post-processing corresponding to the pre-processor 140. The demapper 240 demaps input symbols into coded data, and the channel decoder 250 decodes the coded data to restore the original data. The controller 260 compares CQIs and threshold values with respect to each mode to determine whether or not channel information is to be fed back, and feeds back the channel information.

Figure 3:
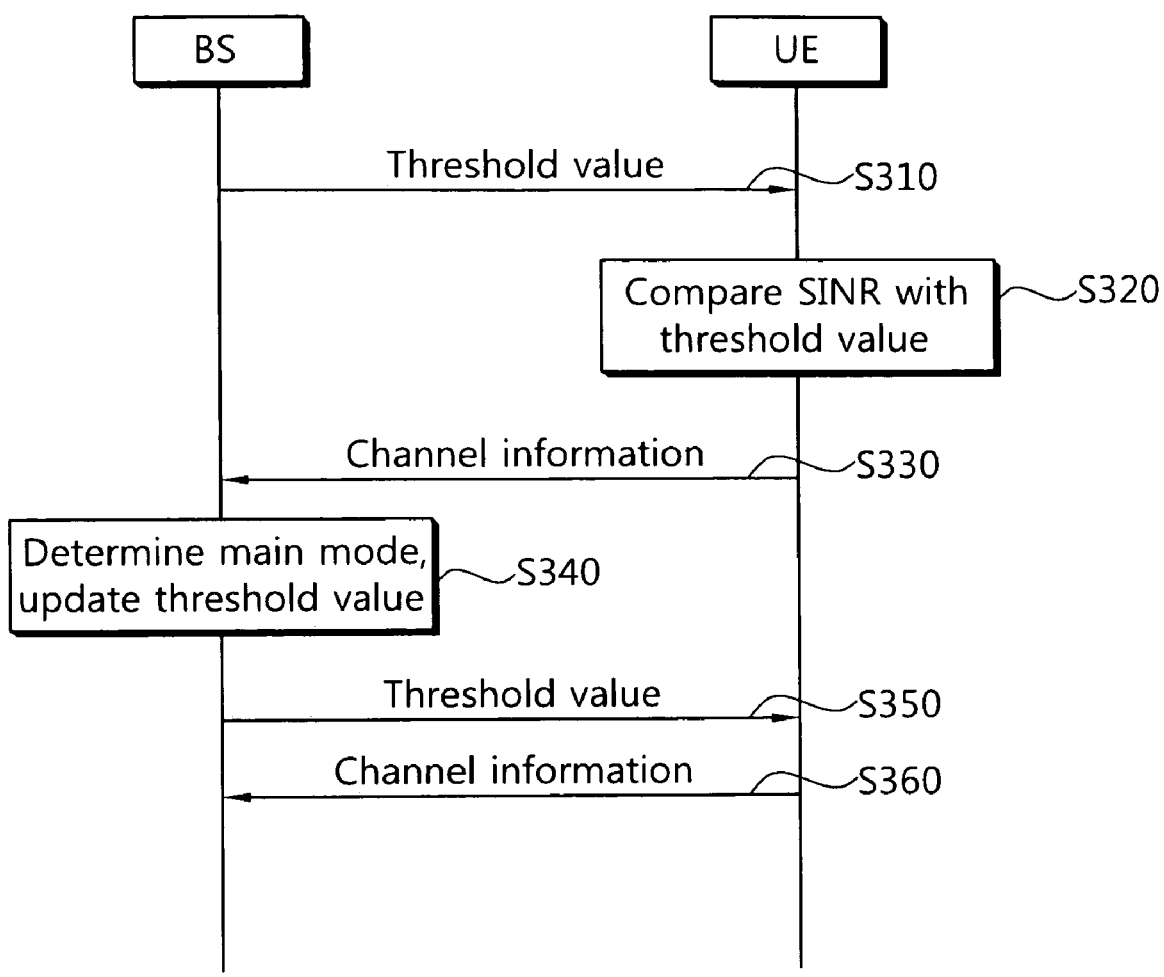
FIG. 3 is a flow chart illustrating a method for transmitting/receiving channel information according to an embodiment of the present invention.

FIG. 3 is a flow chart illustrating a method for transmitting/receiving channel information according to an embodiment of the present invention. Hereinafter, based on downlink, the BS represents a transmitter and the UE represents a receiver, for the sake of brevity.

The BS arbitrarily determines a mode to be used. Here, a currently used mode is referred to as a main mode and a mode not in use is referred to as a remaining mode. The BS sets initial threshold values of the arbitrary main mode and the remaining mode and transmits the same to the UE (S310). The UE calculates channel quality information (CQI) with respect to the modes and compares the CQI with respect to the modes with threshold values of the respective modes (S320). Here, the CQI may be a signal to interference and noise ratio (SINR) or a modulation and coding set (MCS) level.

Upon comparison, the UE feeds back channel information regarding a mode higher than the threshold value to the BS (S330). Here, the channel information may be a CQI, an index with respect to a mode, a matrix codebook index, and a beamforming vector index. If the mode higher than the threshold value is not in use in a current system, the UE may request allocation of a feedback channel to feed back the mode higher than the threshold value. In this case, the uplink feedback request channel may include an index of the mode higher than the threshold value, the CQI, the matrix codebook index, the beamforming vector index, and the like. If the BS needs to periodically observe each mode higher than the threshold value requested by the UE, it may allocate a periodical feedback channel with respect to the corresponding mode to the UE.

The BS determines a main mode by using channel information fed back from the UE, and updates threshold values with respect to the main mode and the remaining mode (S340). Here, a mode in which performance metric is maximized may be determined as the main mode. A total transmission rate may be used as one of the performance metrics. The threshold value with respect to the main mode may be lower than that with respect to the remaining mode. The base station transmits the determined threshold value to the UE (S350). The UE retransmits channel information to the BS by using the threshold values with respect to each mode.

In the PU2RC (Per User Unitary and Rate Control) technique, one main mode is set and feedback of channel information is received from each user. The BS performs user grouping to group users who want the same precoding matrix based on the channel information the users have sent. Here, the BS calculates a total channel capacity that can be obtained when allocating streams to the users of the same group, and determines a precoding matrix of the largest value and users to be allocated streams. In a multi-user multi-input/output system, the mode maximizing a transmission rate of each user may differ according to the number of users or an SNR of each user.

The behavior of selecting by each user a mode and feeding back channel information with respect to the mode is called a distributed mode selection, and the behavior of feeding back channel information with respect to every candidate mode is a centralized mode selection. In the distributed mode selection, the BS should group the users who want the same precoding matrix and further group users who want the same mode, so the effective number of users belonging to the same group is reduced to decrease multi-user diversity.

In an effort to solve this problem, there has been proposed a method of interpretively obtaining an optimum mode in consideration of a CQI, the number of users, the number of antennas, channel correlation, the number of codebooks, and the like, such that all the user feed back with respect to one mode. However, such interpretation is too complicated. Thus, each user is to feed back channel quality information with respect to every mode to enable the BS to select a mode according to the centralized mode selection scheme. However, feeding back channel quality information with respect to every mode by each user leads to a huge increase in the feedback information compared with the existing PU2RC, which imposes a burden on the system compared with the performance improvement.

Thus, the CQIs with respect to the respective modes and the threshold values are compared and only channel information having higher than the threshold value is fed back, whereby the mode can be adaptively selected while reducing the amount of feedback, to thus maximize the transmission rate.

Figure 4:
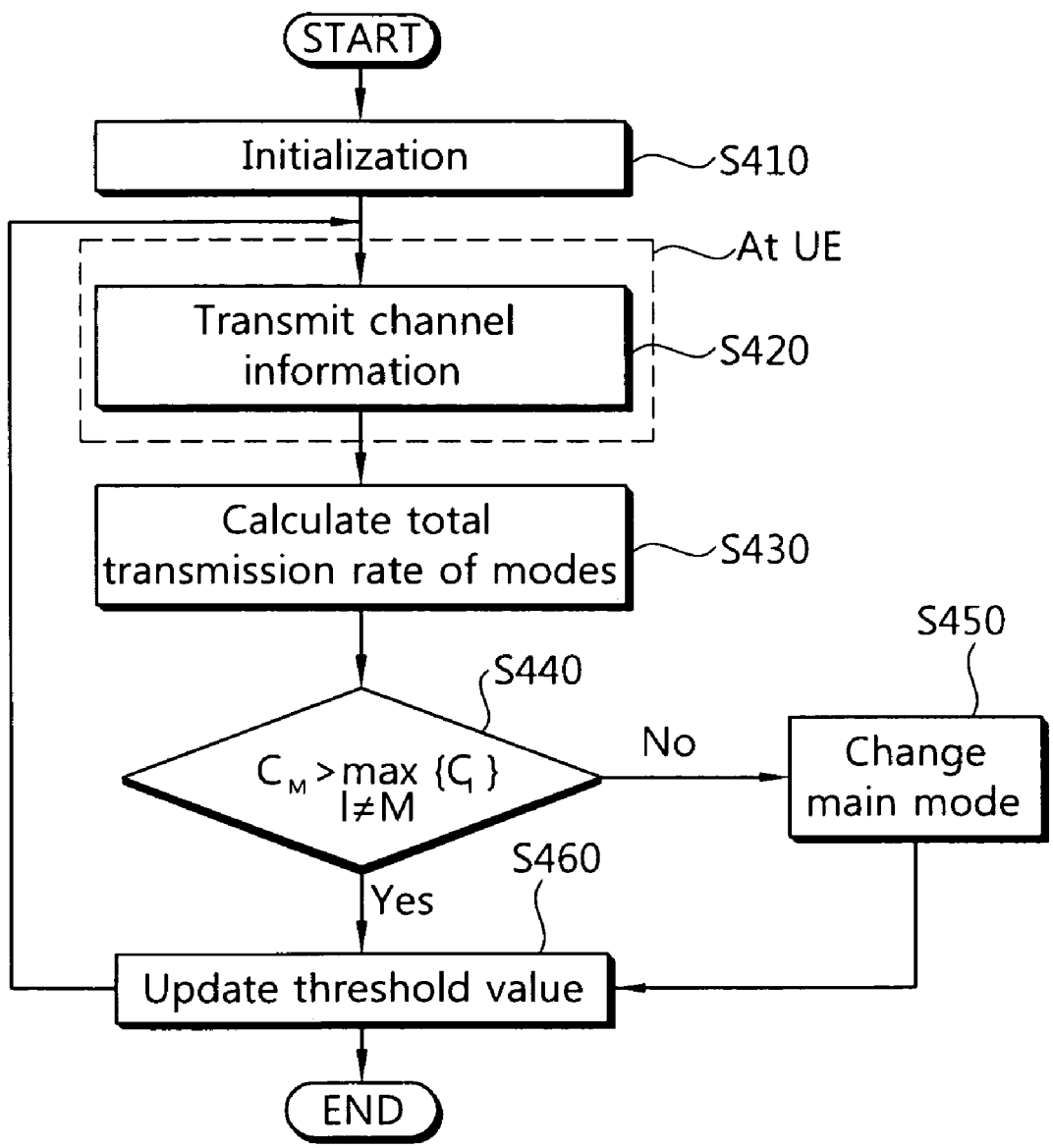
FIG. 4 is a flow chart illustrating a method for receiving channel information according to an embodiment of the present invention.

FIG. 4 is a flow chart illustrating a method for receiving channel information according to an embodiment of the present invention.

The BS selects an arbitrary main mode (S410). A threshold value of the main mode is set as 0, while that of the remaining mode, not the main mode, may be set to infinity. The BS informs the UE about the threshold values of the selected main mode and the remaining mode.

The BS receives channel information from the UE (S420). The channel information includes SINR with respect to each mode. The BS compares the SINRs of the respective modes sent from the UE and the threshold values with respect to the respective modes, and receives channel information transmitted with respect to a mode higher than the threshold value. The method of configuring and transmitting the channel information by the UE will be described later.

The BS calculates a total transmission rate with respect to each mode by using the channel information received from the UE (S430).

And then, the BS determines a main mode to transmit signals by using the total transmission rate with respect to each mode (S440). First, the BS compares the total transmission rate $C_M$ of the arbitrarily selected main mode and that of a mode having a maximum value among the total transmission rates $C_l$ of the remaining modes. Upon comparison, if the total transmission rate of the main mode is larger, the main mode is not changed.

If, however, the total transmission rate of the mode having the maximum value, among the total transmission rates of the remaining modes, is larger, the main mode is changed to the mode having the maximum value in the total transmission rate (S450).

Next, the BS updates the threshold value (S460). The threshold value may be set for each mode. Preferably, the threshold value with respect to the main mode may be set to be lower than those with respect to the remaining modes. The threshold values may be set as represented by Equation 1 shown below:

$$\gamma_{th,M} = 2^{(\alpha C_M/M)} - 1, \alpha < 1$$

$$\gamma_{th,l} = 2^{(C_M/l)} - 1, \forall l, l \neq M \quad \text{[Equation 1]}$$

wherein M is the number of signals of the main mode, l is the number of signal(s) of the remaining mode(s) excluding the main mode, $\gamma_{th,M}$ is a threshold value with respect to the main mode, $\gamma_{th,l}$ is a threshold value with respect to the remaining mode, $C_M$ is the total transmission rate with respect to the main mode, and $\alpha$ is set such that the threshold value with respect to the main mode does not cause an outage within the range of $0 \leq \alpha \leq 1$. $\alpha$ is properly selected such that the threshold value is not so low as to allow every UE using the main mode to feed back or not too high for none of UEs to feed back. For the remaining mode(s) excluding the main mode, the threshold value is determined to be so high as to obtain at least the transmission rate achieved by the current main mode. This is to allow performing feedback only when the remaining mode(s), excluding the main mode, has a higher transmission rate than that of the main mode, to thereby prevent the occurrence of a load of a feedback channel. $C_M$ can be sum of a scheduling metric which is decided mode currently, then the threshold of the main mode can be $$\gamma_{th,M} = \alpha \frac{\lambda_M}{M}, 0 \leq \alpha \leq 1,$$

and the threshold of the remaining mode(s) can be $$\gamma_{th,l} = \frac{\lambda_M}{l}.$$

The feedback condition can be $v_{m,l} \geq \gamma_{th,m} \cdot v_{m,l}$ is a metric value of lth beam of mth mode. That is, CQI is fed back when the scheduling metric is over the threshold.

Equation 2 below shows the process of setting the threshold value by using the total transmission rate $C_M$ with respect to the main mode.

$$C_M = \sum_{i=1}^{M} \log(1 + \gamma_{th,i}) \approx M\log(1 + \gamma_{th}) \quad \text{[Equation 2]}$$

$$\gamma_{th} = 2^{(C_M/M)} - 1$$

wherein the total transmission rate $C_M$ with respect to the main mode is approximated as $M \log(1+\gamma_{th})$, with which the threshold value $\gamma_{th}$ can be easily obtained. However, setting the threshold values by using the total transmission rate as represented by Equation 2 is merely illustrative. The point is that threshold value with respect to the main mode is set so low as not to cause an outage and the threshold value of the remaining mode is set so high as to achieve the transmission rate of the current main mode. This ensures a considerable reduction in the amount of feedback.

Finally, the updated threshold values with respect to the respective modes are sent again to the UE. The UE compares the SINR with respect to each mode to the updated threshold value with respect to each mode, and feeds back an SINR higher than the threshold value with respect to each mode through channel information to the BS. The BS obtains a total transmission rate with respect to each mode by using the received channel information, and compares sizes of the total transmission rates with respect to each mode to search for an optimum main mode. The BS repeatedly performs this process.

Figure 5:
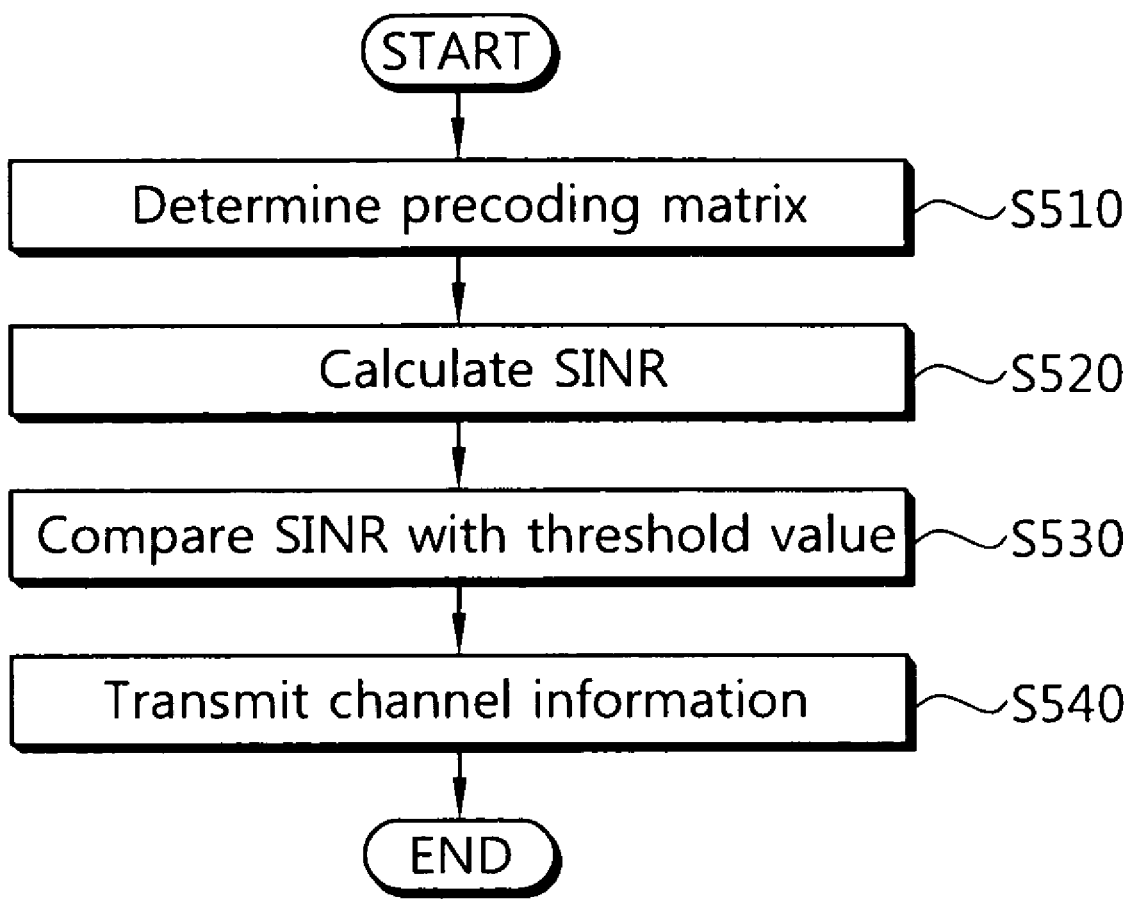
FIG. 5 is a flow chart illustrating a method for transmitting channel information according to an embodiment of the present invention.

FIG. 5 is a flow chart illustrating a method for transmitting channel information according to an embodiment of the present invention.

First, the UE selects the optimum precoding matrix (S510). Here, the BS and the UE already know a precoding matrix codebook. The precoding matrix codebook includes G number of precoding matrixes, and the UE selects an optimum precoding matrix that can maximize a transmission rate from among the G number of precoding matrixes. The precoding matrix at which a total transmission rate with respect to each mode is maximized may vary, but in general, as for the precoding matrix the total transmission rate is maximized when the main mode is the same as $N_T$, the number of transmit antennas, a total transmission rate of such precoding matrix is maximized for any other modes. Thus, the precoding matrix may be determined by using the main mode $N_T$. The kth UE selects an optimum precoding matrix by using Equation 3 shown below:

$$T_k^{opt} = \arg\max_g \left( \sum_{m=1}^{N_T} \gamma_{k,N_T,1,m}^g \right) \quad \text{[Equation 3]}$$

wherein $N_T$ is the number of transmit antennas, and $\gamma_{k,N_T,1,m}^g$ is the SINR with respect to the main mode $N_T$ with respect to the mth column of the Gth precoding matrix.

Next, the UE calculates SINR with respect to each mode (S520). The SINR may be obtained by using an effective channel with respect to the optimum precoding matrix. Here, the effective channel $H^g_{eff,k,L,j}$ of the kth UE which has selected the Gth precoding matrix may be represented by Equation 4 shown below:

$$H_{eff,k,L,j}^g = H_k F_{L,j}^g, g=[1, 2, \ldots, G] \quad \text{[Equation 4]}$$

wherein $H_k$ is the channel matrix of the kth UE of $N_R \times N_T$, F is the precoding matrix, L is the number of transmission signals, j is an index with respect to combinations that can be generated in a corresponding mode, and G is the number of precoding matrices.

SINR $\gamma^g_{k,L,j,m}$ of the kith UE may be represented by Equation 5 shown below by using the effective channel calculated according to Equation 4:

$$\gamma_{k,L,j,m}^g = \frac{P}{L}(h_{eff,k,L,j,m}^g)^H \quad \text{[Equation 5]}$$

$$\left( \sum_{n\neq m, n \in A_{L,j}} \frac{P}{L}(h_{eff,k,L,j,n}^g)\cdot(h_{eff,k,L,j,n}^g)^H + \sigma^2 I_{N_R} \right)^{-1}$$

$$(h_{eff,k,L,j,m}^g)$$

$$m \in A_{L,j},$$

wherein $h^g_{eff,k,L,j,m}$ is the effective channel with respect to the mth row of the Gth precoding matrix in a mode of the kth UE in which the number of transmission signals is L and an index with respect to combinations that can be generated in a corresponding mode is j, $\sigma^2$ is distribution of white noise, and P is transmission power of the BS.

Next, the UE compares SINRs with respect to each mode with threshold values with respect to each mode (S530). Here, the threshold values may be previously set by the BS or may be set to be different according to each mode. Preferably, the threshold value with respect to the main mode may be set to be lower than that (those) of the remaining mode(s).

And then, the UE transmits channel information to the BS (S540). The UE feeds back the channel information to the BS only when the SINRs with respect to the respective modes are higher than the threshold values with respect to the respective modes. Here, the channel information may be an SINR, a mode, a matrix codebook index, and a beamforming index. Thus, the channel information of the UE using the main mode may be fed back more easily than a UE using the remaining mode. As a result, unlike the related art in which channel information with respect to every UE is fed back, in the present invention, only channel information of the UE having an SINR higher than the threshold value is fed back, the amount of feedback can be drastically reduced.

Figure 6:
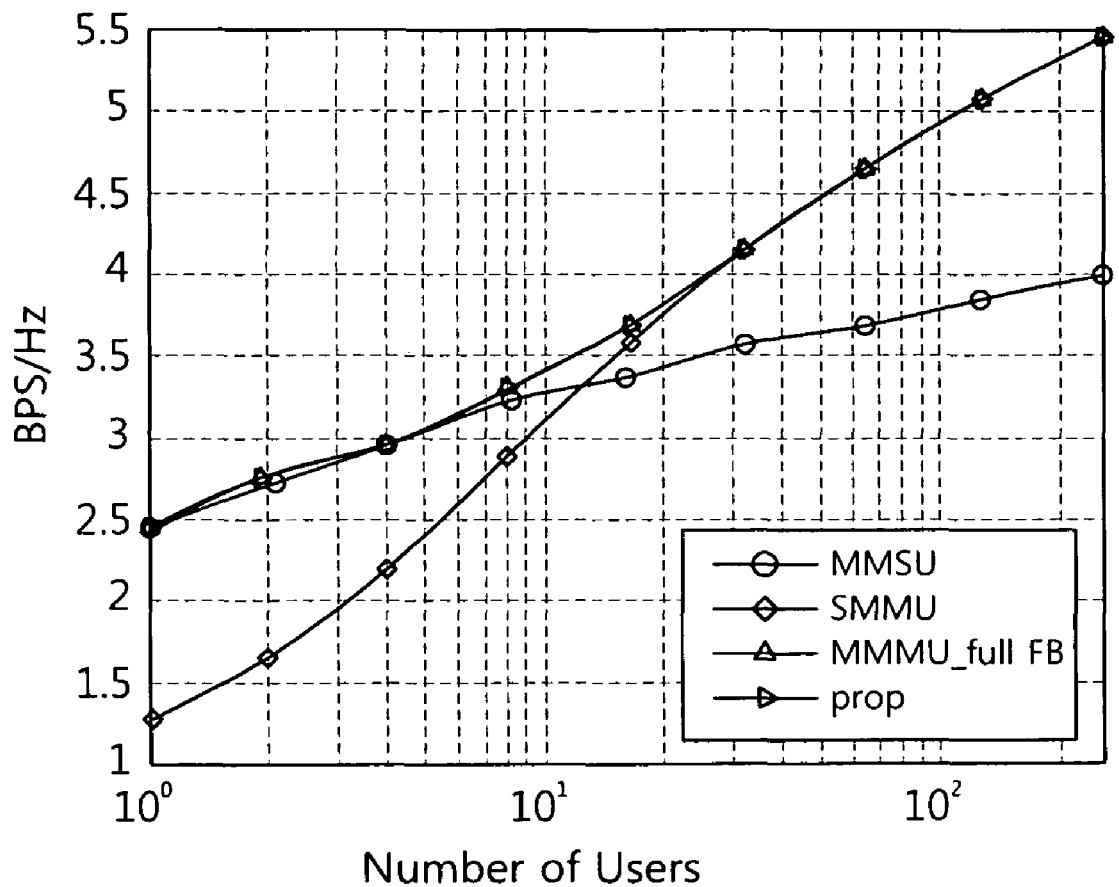
FIG. 6 is a graph of results of a total transmission rate over the number of UEs under the condition that $N_T=4$, $N_R=2$, SNR=0 dB, and G=4.

FIG. 6 is a graph of results of a total transmission rate over the number of UEs under the condition that $N_T$=4, $N_R$=2, SNR=0 dB, and G=4. With reference to FIG. 6, the graph of the proposed invention passes intersection of the graph with respect to the single user multi-input/output scheme and the graph with respect to the multi-user multi-input/output scheme. Also, the graph of the proposed invention is similar to a graph with respect to the overall feedback scheme of the multi-user multi-input/output.

Figure 7:
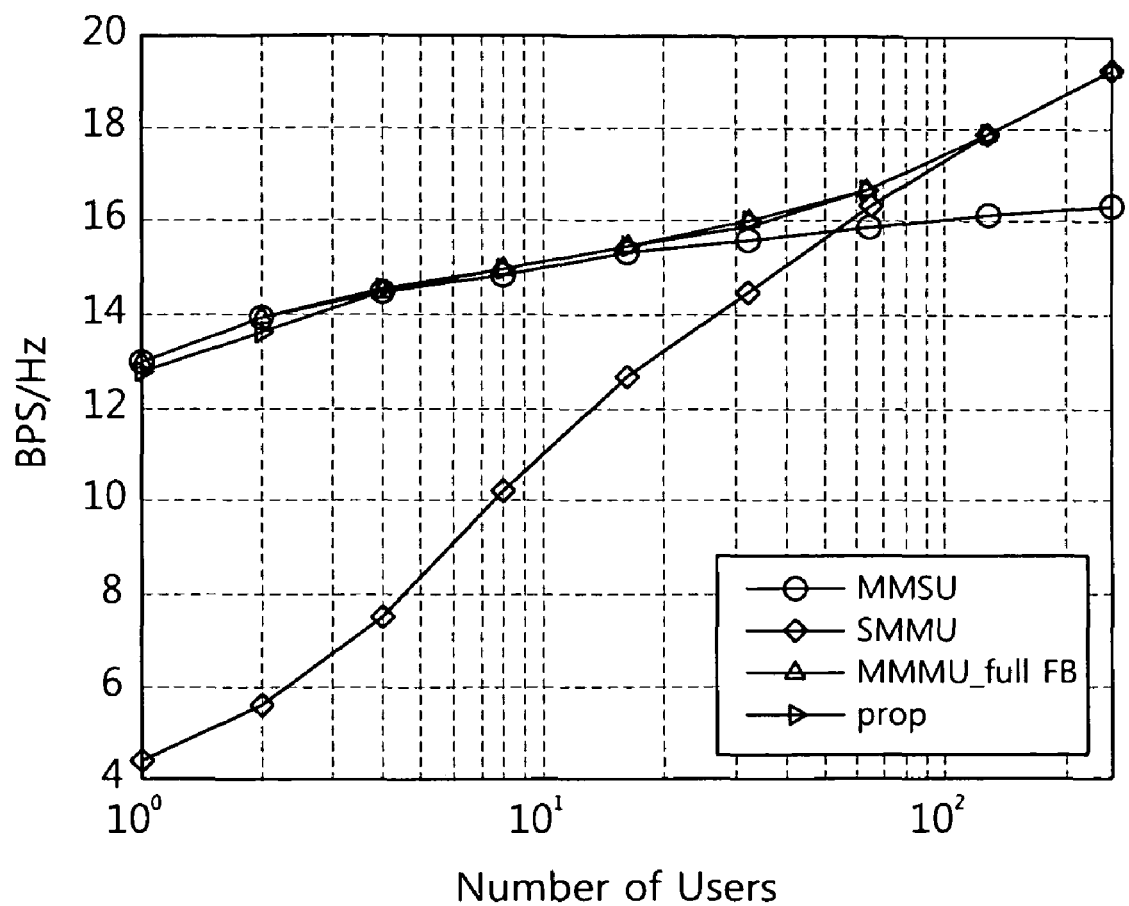
FIG. 7 is a graph of results of a total transmission rate over the number of UEs under the condition that $N_T=4$, $N_R=2$, SNR=20 dB, and G=4.

FIG. 7 is a graph of results of a total transmission rate over the number of UEs under the condition that $N_T$=4, $N_R$=2, SNR=20 dB, and G=4. With reference to FIG. 7, the graph of the proposed invention passes intersection of the graph with respect to the single user multi-input/output scheme and the graph with respect to the multi-user multi-input/output scheme. Also, the graph of the proposed invention is similar to a graph with respect to the overall feedback scheme of the multi-user multi-input/output.

Figure 8:
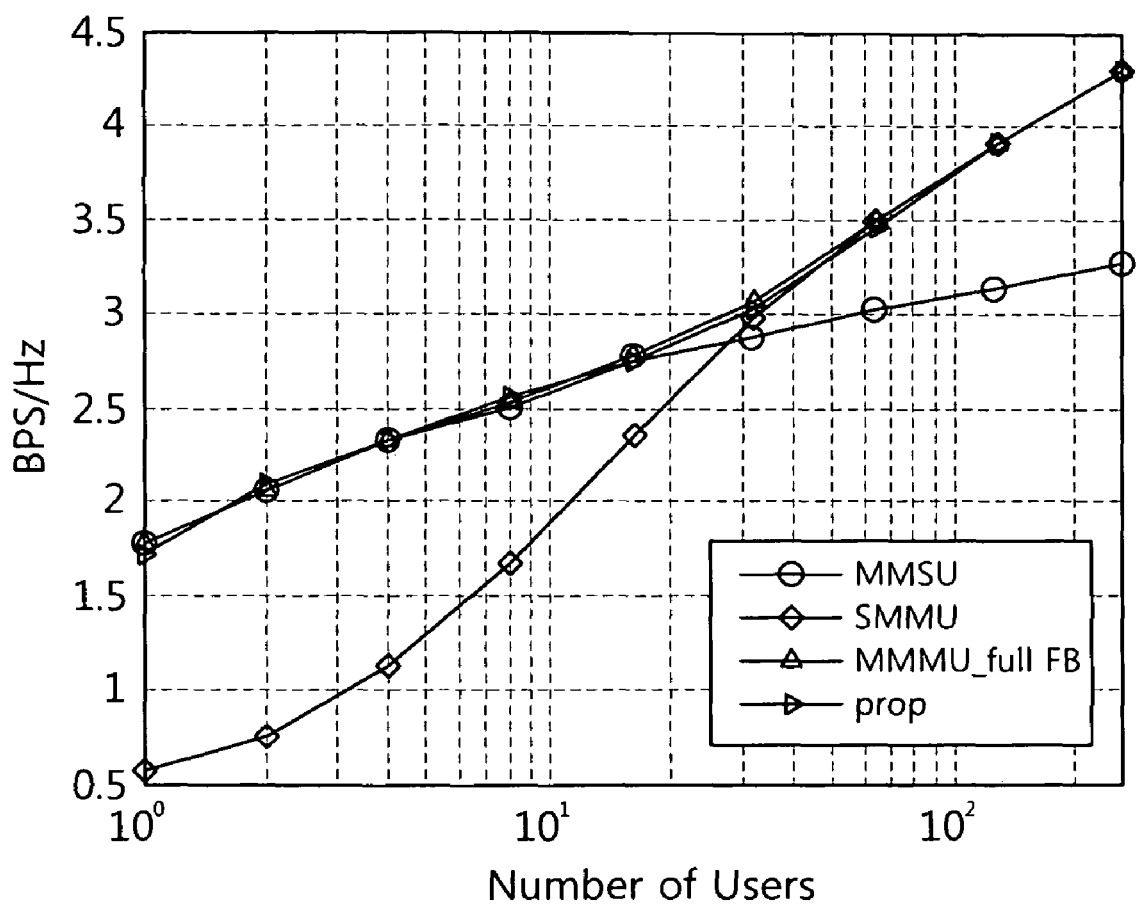
FIG. 8 is a graph of results of a total transmission rate over the number of UEs under the condition that $N_T=4$, $N_R=1$, SNR=0 dB, and G=4.

FIG. 8 is a graph of results of a total transmission rate over the number of UEs under the condition that $N_T$=4, $N_R$=1, SNR=0 dB, and G=4. With reference to FIG. 8, the graph of the proposed invention passes intersection of the graph with respect to the single user multi-input/output scheme and the graph with respect to the multi-user multi-input/output scheme. Also, the graph of the proposed invention is similar to a graph with respect to the overall feedback scheme of the multi-user multi-input/output.

Figure 9:
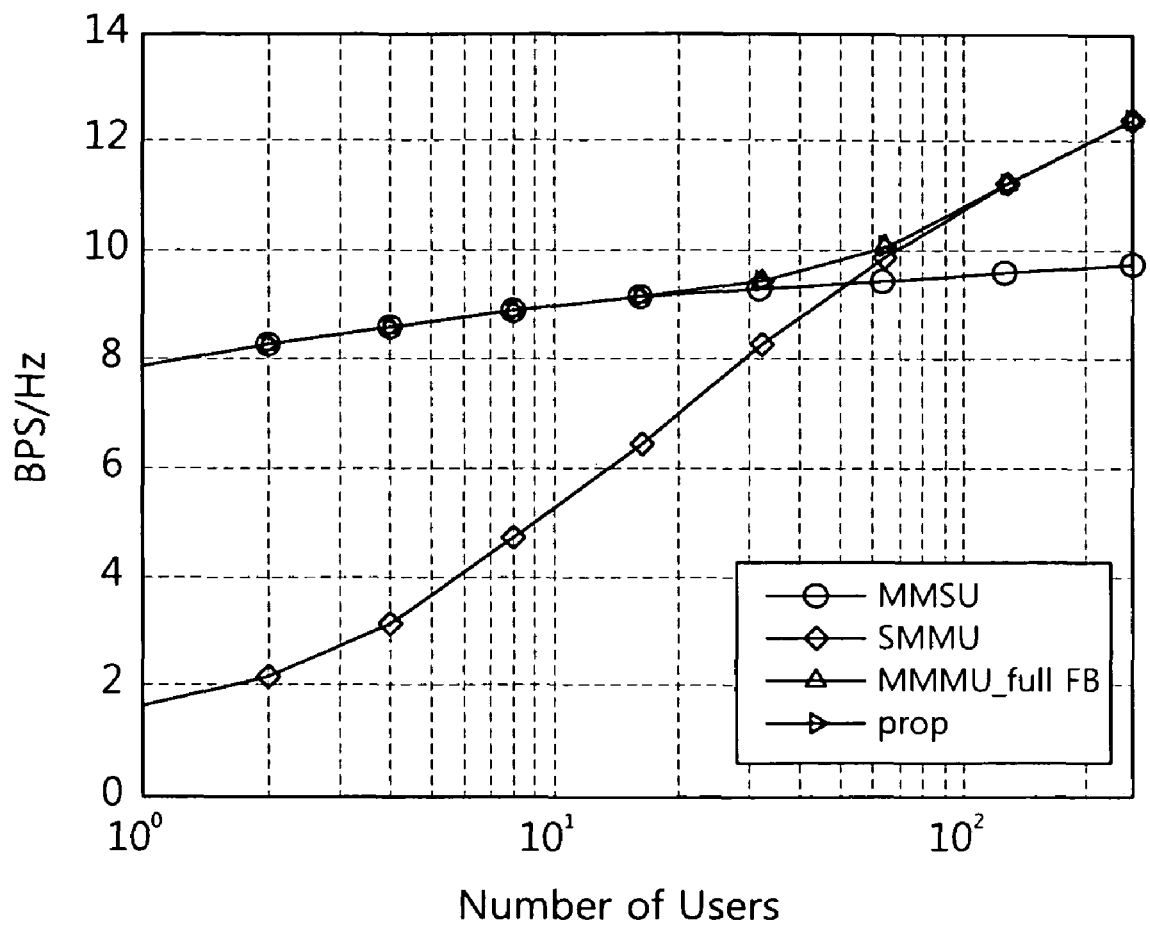
FIG. 9 is a graph of results of a total transmission rate over the number of UEs under the condition that $N_T=4$, $N_R=1$, SNR=20 dB, and G=4.

FIG. 9 is a graph of results of a total transmission rate over the number of UEs under the condition that $N_T=4$, $N_R=1$ SNR=20 dB, and G=4. With reference to FIG. 9, the graph of the proposed invention passes intersection of the graph with respect to the single user multi-input/output scheme and the graph with respect to the multi-user multi-input/output scheme. Also, the graph of the proposed invention is similar to a graph with respect to the overall feedback scheme of the multi-user multi-input/output.

Figure 10:
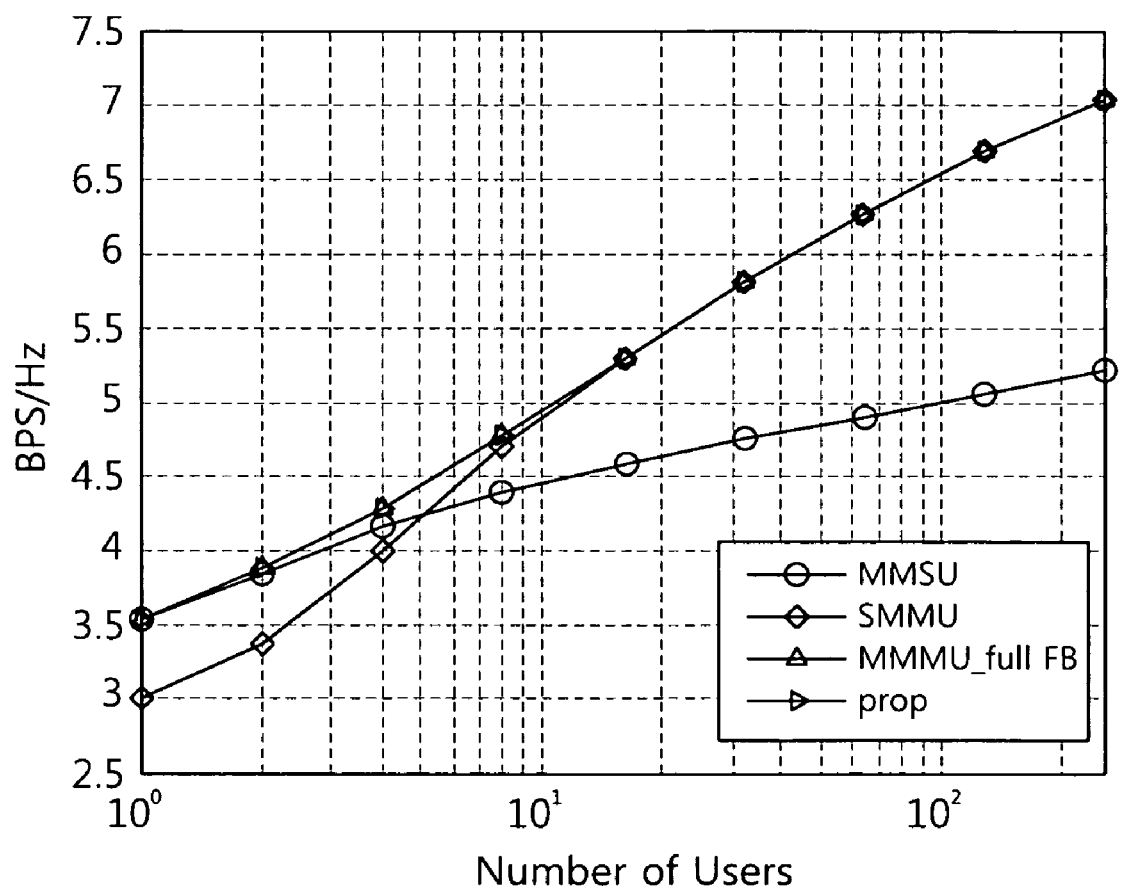
FIG. 10 is a graph of results of a total transmission rate over the number of UEs under the condition that $N_T=4$, $N_R=4$, SNR=0 dB, G=4.

FIG. 10 is a graph of results of a total transmission rate over the number of UEs under the condition that $N_T=4$, $N_R=4$, SNR=0 dB, G=4. With reference to FIG. 10, the graph of the proposed invention passes intersection of the graph with respect to the single user multi-input/output scheme and the graph with respect to the multi-user multi-input/output scheme. Also, the graph of the proposed invention is similar to a graph with respect to the overall feedback scheme of the multi-user multi-input/output.

Figure 11:
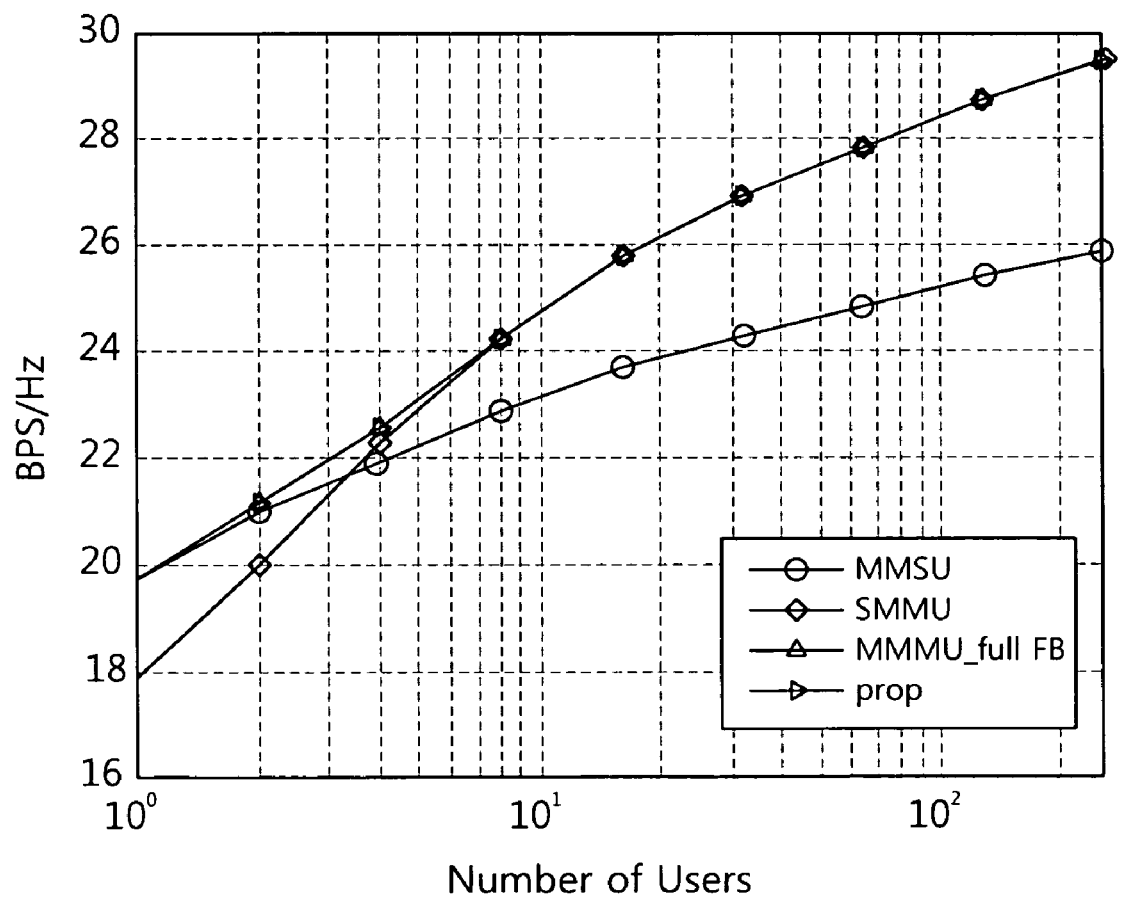
FIG. 11 is a graph showing results of a total transmission rate over the number of UEs under the condition that $N_T=4$, $N_R=4$, SNR=20 dB, G=4.

FIG. 11 is a graph showing results of a total transmission rate over the number of UEs under the condition that $N_T=4$, $N_R=4$, SNR=20 dB, G=4. With reference to FIG. 11, the graph of the proposed invention passes intersection of the graph with respect to the single user multi-input/output scheme and the graph with respect to the multi-user multi-input/output scheme. Also, the graph of the proposed invention is similar to a graph with respect to the overall feedback scheme of the multi-user multi-input/output.

According to FIGS. 6 to 11, the proposed invention exhibits the maximum performance even in the environment in which there are not many UEs, as well as in the environment in which there are many UEs. In addition, even in a state that the feedback amount is reduced, the proposed invention exhibits the same performance as the case of overall feedback.

Figure 12:
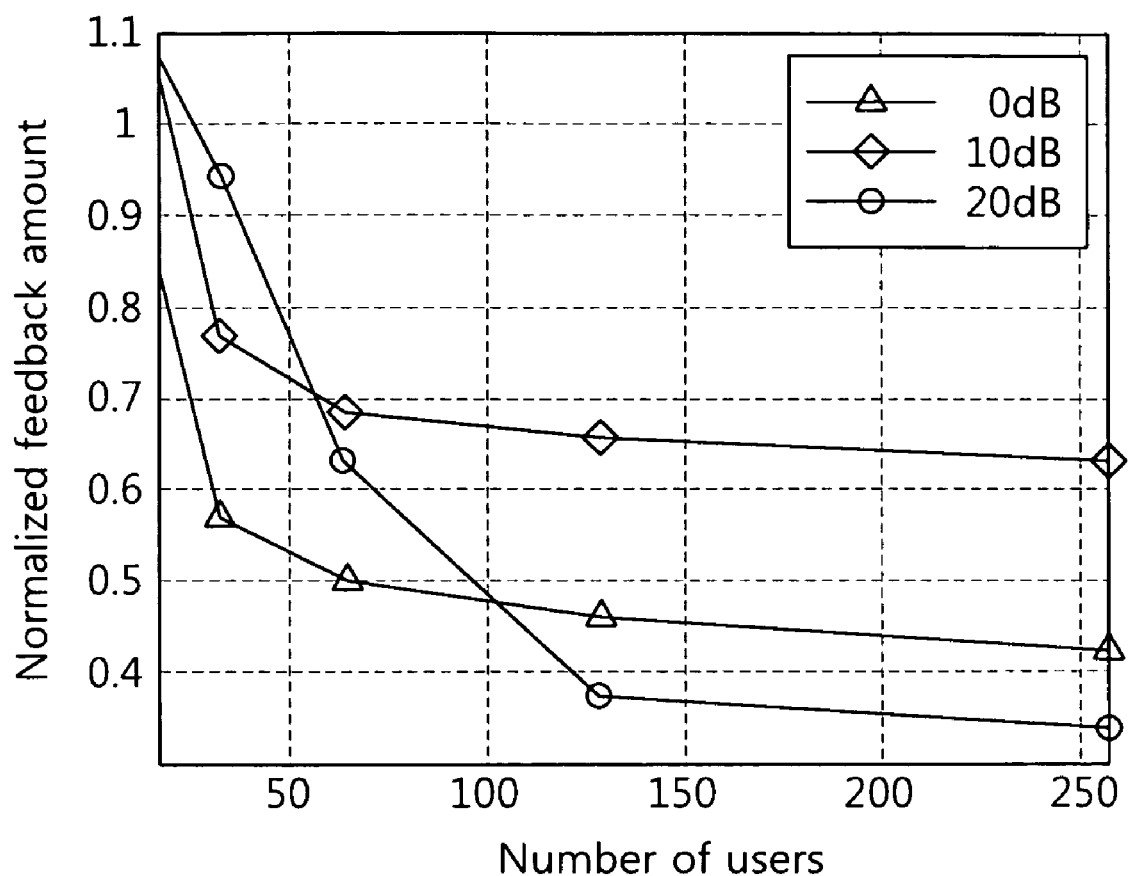
FIG. 12 is a graph of the amount of feedback according to an embodiment of the present invention over the amount of feedback 1 according to the related art PU2RC (Per User Unitary and Rate Control) scheme under the condition that $N_T=4$, $N_R=1$, and G=4.

FIG. 12 is a graph of the amount of feedback according to an embodiment of the present invention over the amount of feedback according to the related art PU2RC scheme which is set to 1 under the condition that $N_T=4$, $N_R=1$, and G=4. With reference to FIG. 12, the most feedback amount is smaller than 1 regardless of the number of UEs and SNR.

Figure 13:
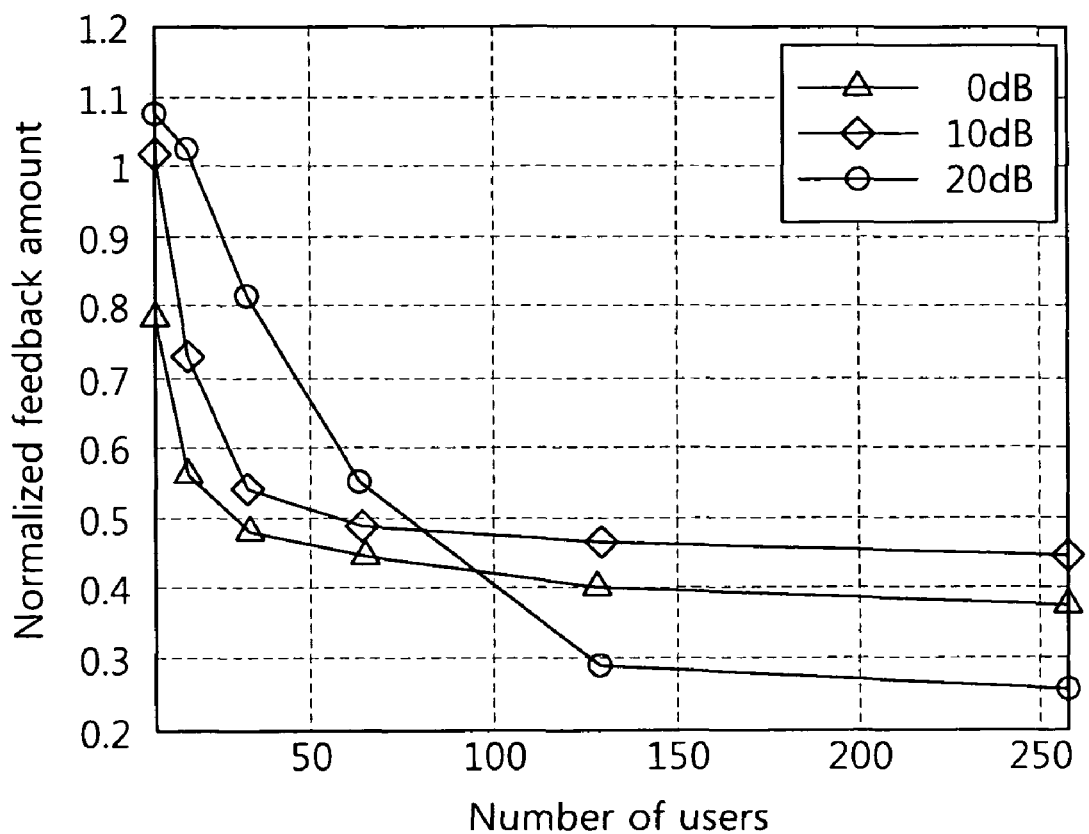
FIG. 13 is a graph of the amount of feedback according to an embodiment of the present invention over the amount of feedback 1 according to the related art PU2RC scheme under the condition that $N_T=4$, $N_R=2$, and G=4.

FIG. 13 is a graph of the amount of feedback according to an embodiment of the present invention over the amount of feedback 1 according to the related art PU2RC scheme which is set to 1 under the condition that $N_T=4$, $N_R=2$, and G=4. With reference to FIG. 13, the most feedback amount is smaller than 1 regardless of the number of UEs and SNR.

Figure 14:
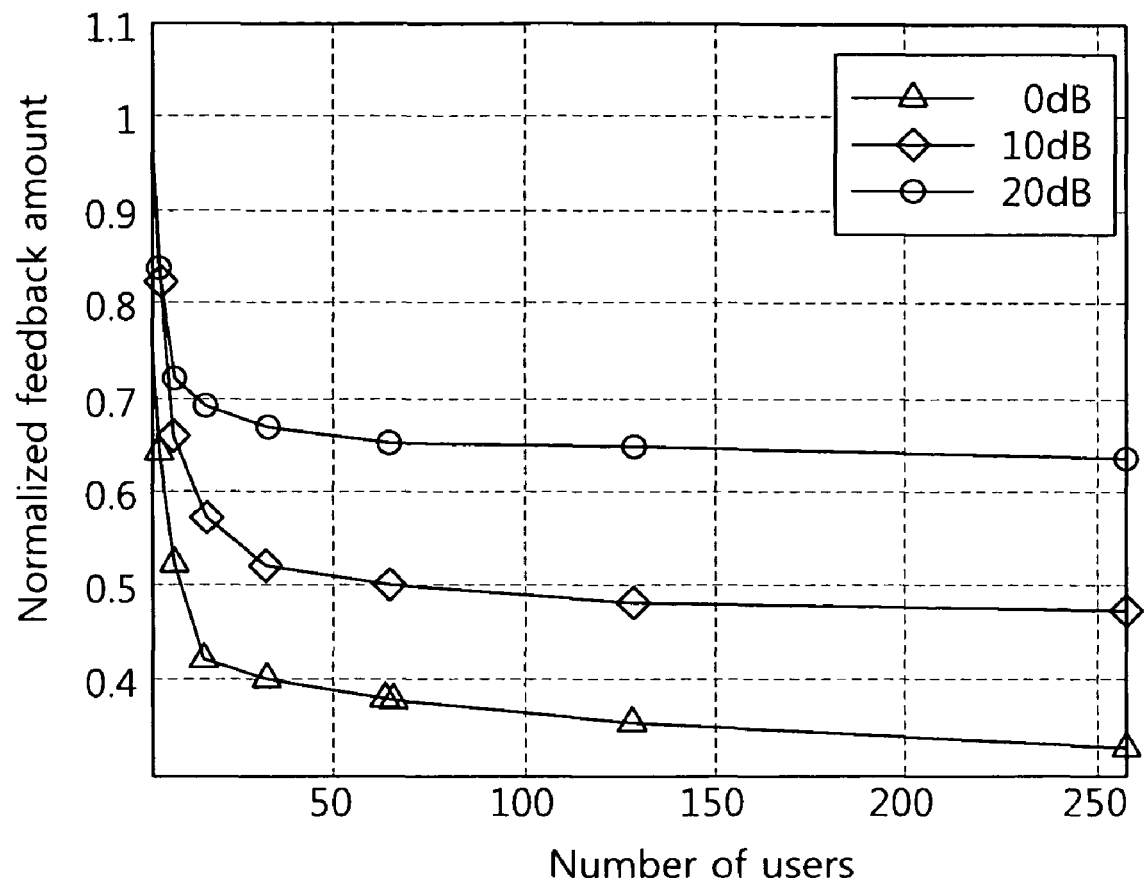
FIG. 14 is a graph of the amount of feedback according to an embodiment of the present invention over the amount of feedback 1 according to the related art PU2RC scheme under the condition that $N_T=4$, $N_R=4$, and G=4.

FIG. 14 is a graph of the amount of feedback according to an embodiment of the present invention over the amount of feedback 1 according to the related art PU2RC scheme which is set to 1 under the condition that $N_T=4$, $N_R=4$, and G=4. With reference to FIG. 14, the most feedback amount is smaller than 1 regardless of the number of UEs and SNR.

According to FIGS. 12 to 14, it is noted that the feedback amount of the proposed invention is reduced compared with the related art PU2RC.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

According to the method for transmitting/receiving channel information of the present invention, in a multi-antenna system, an optimum mode can be adaptively determined regardless of the number of users, a reception CQI, the number of precoding matrix codebooks, the structure of a receiver, and the number of transmit/receive antennas, to thereby achieve good performance and reduce the amount of information fed back from the UE to the base station.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A method for transmitting channel information in a multi-antenna system, the method comprising:
   calculating channel quality information (CQI) with respect to each mode;
   comparing the CQI with respect to each mode to a threshold value with respect to each mode;
   transmitting CQI with respect to a mode having higher CQI than the threshold value as channel information; and
   receiving updated threshold values which update the threshold value with respect to each mode,
   wherein the updated threshold values are updated by using the transmitted CQI.

2. The method of claim 1, further comprising:
   receiving a threshold value of each mode.

3. The method of claim 1, wherein a threshold value with respect to a main mode which is used currently is lower than a threshold value with respect to a remaining mode.

4. The method of claim 1, wherein the CQI is transmitted with respect to a scheduling metric according to the CQI being greater than the threshold value.

5. A method for receiving channel information in a multi-antenna system, the method comprising:
   receiving channel quality information (CQI) with respect to each mode having higher CQI than a threshold value;
   updating the threshold value with respect to each mode by using the received CQI; and
   transmitting the updated threshold values.

6. The method of claim 5, wherein a threshold value with respect to a main mode is lower than a threshold value with respect to a remaining mode.

7. The method of claim 5, further comprising:
   determining a main mode by using the CQI.

8. The method of claim 7, wherein the main mode is a mode in which performance metric obtained by using the CQI is maximized.

* * * * *